United States Patent
Maguire et al.

(10) Patent No.: US 9,056,795 B2
(45) Date of Patent: Jun. 16, 2015

(54) SUPPORT FOR A FIRED ARTICLE

(75) Inventors: Michael Christopher Maguire, Napa, CA (US); Michael Dean Baldwin, Napa, CA (US); Max Eric Schlienger, Napa, CA (US); Ariel Eugenio, Benicia, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 630 days.

(21) Appl. No.: 12/853,228

(22) Filed: Aug. 9, 2010

(65) Prior Publication Data

US 2011/0068517 A1    Mar. 24, 2011

Related U.S. Application Data

(60) Provisional application No. 61/232,446, filed on Aug. 9, 2009.

(51) Int. Cl.
*C04B 33/32* (2006.01)
*B28B 7/34* (2006.01)

(52) U.S. Cl.
CPC .............. *C04B 33/32* (2013.01); *B28B 7/342* (2013.01); *C04B 2235/6028* (2013.01)

(58) Field of Classification Search
CPC .... B28B 7/34; C04B 33/32; C04B 2235/6028
USPC .......... 249/61, 62, 114.1–116, 120, 134, 144; 264/605, 610, 630, 642, 669, 671, 673; 164/364, 369, 411, 516, 519; 428/307.7, 310.5
See application file for complete search history.

(56) References Cited

U.S. PATENT DOCUMENTS

| | | | | | |
|---|---|---|---|---|---|
| 3,426,834 A | * | 2/1969 | Jacobs et al. | ................... | 164/235 |
| 3,747,663 A | * | 7/1973 | Taylor | ........................... | 164/516 |
| 4,755,220 A | * | 7/1988 | Woditsch et al. | ............... | 75/233 |
| 4,808,360 A | * | 2/1989 | Natori et al. | ................... | 264/221 |
| 5,164,920 A | * | 11/1992 | Bast et al. | ..................... | 367/140 |
| 5,394,932 A | * | 3/1995 | Carozza et al. | ............... | 164/137 |
| 5,569,320 A | * | 10/1996 | Sasaki et al. | ............. | 106/287.26 |

(Continued)

FOREIGN PATENT DOCUMENTS

| GB | 1308958 A | 3/1973 | | |
|---|---|---|---|---|
| GB | 2255309 A | * | 11/1992 | ................ B28B 3/00 |

OTHER PUBLICATIONS

International Search Report and Written Opinion, PCT/US2010/044924, Nov. 4, 2010, Rolls-Royce Corporation.

(Continued)

*Primary Examiner* — Dimple Bodawala
(74) *Attorney, Agent, or Firm* — Krieg DeVault LLP

(57) ABSTRACT

An article produced using, among other techniques, free-form fabrication having a binder matrix and particles can be supported during a temperature processing, such as burn-out of the binder matrix, with a support composition to maintain geometry and/or alleviate changes in geometry of the article. The support composition can take a variety of forms such as foams, two phase materials, plastic powders, carbon powders, etc. The support material is sacrificed during the thermal processing, such as through decomposition. Such a decomposition can occur when the support composition evolves into a carbonaceous structure. The support composition can also oxidize to a gas, melt, or vaporize, among other types of sacrificial action.

15 Claims, 2 Drawing Sheets

(56) References Cited

U.S. PATENT DOCUMENTS

| | | | |
|---|---|---|---|
| 5,640,767 A * | 6/1997 | Jackson et al. | 29/889.721 |
| 5,711,912 A * | 1/1998 | Chatterjee et al. | 264/428 |
| 5,818,149 A | 10/1998 | Safari et al. | |
| 6,000,457 A | 12/1999 | Vandermeer | |
| 6,004,500 A * | 12/1999 | Safari et al. | 264/610 |
| 6,242,163 B1 * | 6/2001 | Stampfl et al. | 430/322 |
| 6,261,511 B1 * | 7/2001 | Miyake et al. | 264/642 |
| 6,431,255 B1 * | 8/2002 | Ghosh et al. | 164/361 |
| 6,467,534 B1 * | 10/2002 | Klug et al. | 164/517 |
| 6,481,490 B1 | 11/2002 | Vihtelic et al. | |
| 6,582,812 B1 * | 6/2003 | Grylls et al. | 428/307.7 |
| 6,749,006 B1 * | 6/2004 | Yang et al. | 164/516 |
| 7,411,204 B2 * | 8/2008 | Appleby et al. | 250/505.1 |
| 7,448,433 B2 * | 11/2008 | Ortiz et al. | 164/516 |
| 7,462,852 B2 * | 12/2008 | Appleby et al. | 250/505.1 |
| 7,487,819 B2 * | 2/2009 | Wang et al. | 164/28 |
| 7,958,932 B2 * | 6/2011 | Chaudhry et al. | 164/516 |
| 8,196,640 B1 * | 6/2012 | Paulus et al. | 164/34 |
| 2001/0042607 A1 | 11/2001 | Roesler et al. | |
| 2002/0051706 A1 | 5/2002 | Maehnle et al. | |
| 2002/0157799 A1 | 10/2002 | Sachs et al. | |
| 2003/0057096 A1 | 3/2003 | Morales et al. | |
| 2005/0046054 A1 * | 3/2005 | Way et al. | 261/122.1 |
| 2005/0205232 A1 * | 9/2005 | Wang et al. | 164/361 |
| 2005/0212185 A1 * | 9/2005 | Miyazawa | 264/621 |
| 2006/0065383 A1 * | 3/2006 | Ortiz et al. | 164/4.1 |
| 2006/0071373 A1 * | 4/2006 | Bauer et al. | 264/610 |
| 2006/0118266 A1 * | 6/2006 | Frasier et al. | 164/122.1 |
| 2007/0246183 A1 | 10/2007 | Beals et al. | |
| 2008/0006384 A1 * | 1/2008 | Memmen | 164/45 |
| 2008/0181774 A1 | 7/2008 | Cunha | |
| 2008/0190582 A1 | 8/2008 | Lee et al. | |
| 2008/0202718 A1 | 8/2008 | Paul et al. | |
| 2008/0216983 A1 | 9/2008 | Whitton | |
| 2009/0008058 A1 | 1/2009 | Chaudhry et al. | |
| 2009/0123810 A1 | 5/2009 | Devoe et al. | |
| 2009/0217524 A1 * | 9/2009 | Domey et al. | 29/890 |
| 2010/0028645 A1 | 2/2010 | Maguire et al. | 428/221 |
| 2011/0132562 A1 * | 6/2011 | Merrill et al. | 164/9 |
| 2011/0132563 A1 * | 6/2011 | Merrill et al. | 164/15 |
| 2013/0037978 A1 * | 2/2013 | Kley | 264/4 |
| 2013/0049269 A1 * | 2/2013 | Uoe | 264/631 |

OTHER PUBLICATIONS

Partial Supplemental European Search Report in corresponding European application (i.e., EP10808604.2), mailed Feb. 25, 2015 (6 pages).

* cited by examiner

SUPPORT FOR A FIRED ARTICLE

CROSS REFERENCE TO RELATED APPLICATION

The present application claims the benefit of U.S. Provisional Patent Application No. 61/232,446 filed Aug. 9, 2009, which is incorporated herein by reference

TECHNICAL FIELD

The present invention generally relates to fired articles such as molds, and more particularly, but not exclusively, to supports for the fired articles.

BACKGROUND

Providing support for articles capable of being fired or heated during a temperature processing period remains an area of interest. One non-limiting example of such articles include green ceramic articles initially having a shape formed of a binder matrix and ceramic particles where, during a thermal processing, the binder matrix is eliminated and the ceramic particles are fused. Some existing systems have various shortcomings relative to certain applications. Accordingly, there remains a need for further contributions in this area of technology.

SUMMARY

One embodiment of the present invention is a unique support of an article capable of being fired. Other embodiments include apparatuses, systems, devices, hardware, methods, and combinations for supporting an article during a firing process to minimize a change in geometry of the article. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
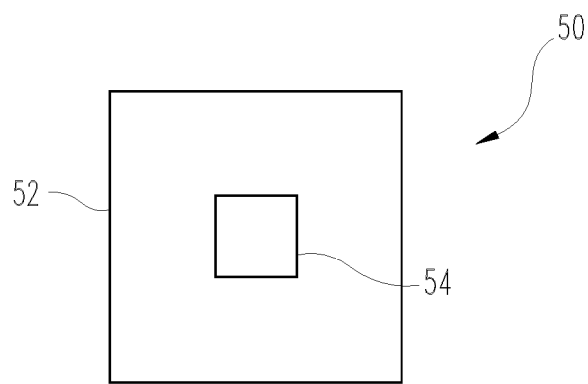
FIG. 1 depicts one embodiment of an article.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 4:
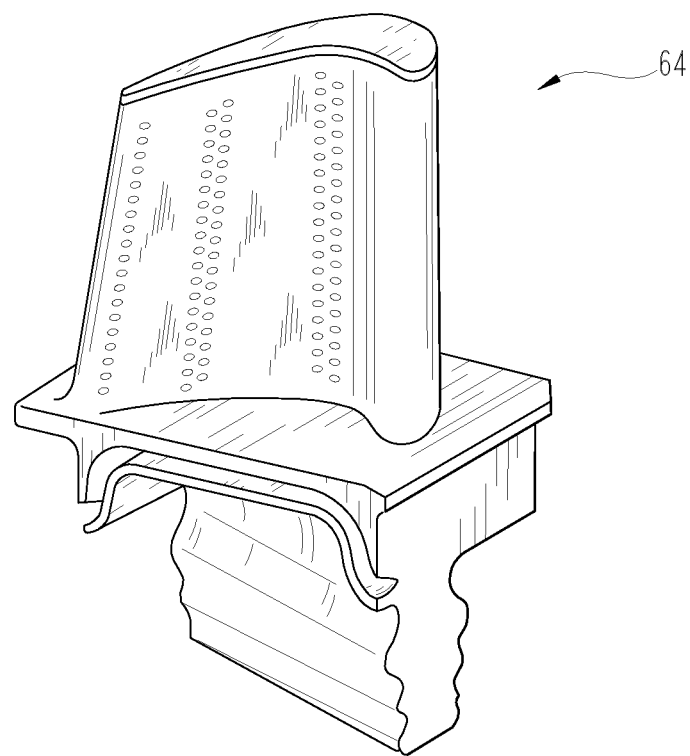
FIG. 4 depicts an embodiment of a gas turbine engine component.

With reference to FIG. 1 and following figures, an article 50 will be described that can be manufactured and processed for use as an investment casting mold. In some forms the investment casting mold can be used to produce aircraft gas turbine engine components such as, but not limited to, blades and/or vanes an example of which is shown as reference numeral 64 in FIG. 4. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The article 50 can be produced using a variety of techniques, including but not limited to free-form fabrication techniques. To set forth just one non-limiting example, the article 50 can be produced using virtual pattern casting. In one embodiment the article 50 can be formed of a binder mixture, such as photoactive polymeric resin, and particles, such as ceramic particles. In other forms the article 50 can be substantially ceramic and in others can be made using other types or forms of constituents.

Figure 5:
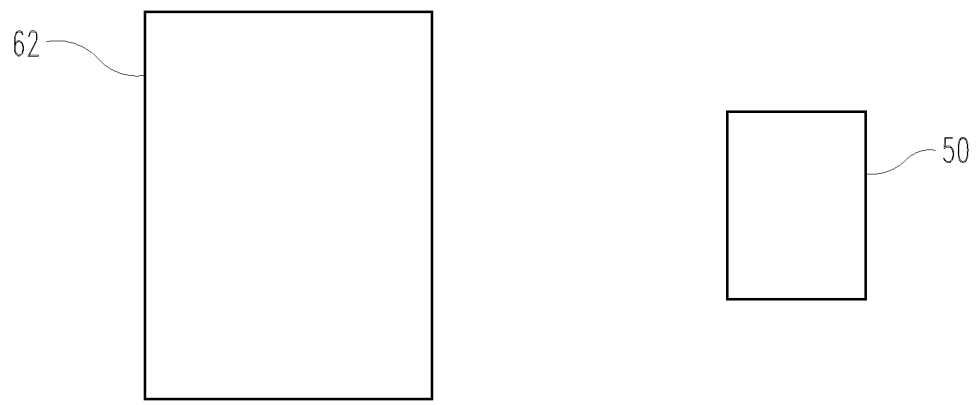
FIG. 5 depicts an embodiment of a furnace or oven.

The article 50 can be processed in an environment where the temperature of the article is increased over time. For example, the article 50 can be placed in a furnace or oven 62 (shown in FIG. 5) which provides the energy required to raise the temperature of the article. In the embodiments of the article 50 having the binder matrix this process can include at least two phases, which may or may not be entirely distinct from each other. In the first phase, sometimes called the burn-out, the article 50 is processed from a first green state to a second state characterized by a loss of at least a portion of the binder matrix; that is, the binder matrix at least partially leaves the article 50 causing it to shrink in size in at least one dimension. The term "burn-out" refers to any process by which the binder matrix at least partially leaves the article 50. In some applications the binder matrix is removed via a pyrolosis process but other types of processes are also contemplated herein. During the burn-out the article 50 can become relatively weakened, such as through softening, which can lead to changes in shape in the article 50. During the second phase, which typically occurs at higher temperatures relative to the burn-out, the article 50 is thermally processed to a third state at which the article 50 becomes hardened; that is the particles can be bonded together thus forming a hardened article. In some embodiments the particles can be bonded by sintering. The hardened article can be used as a mold for investment casting as mentioned above. The thermal processing can take the form of a time dependent temperature profile that may or may not include temperature holds at certain temperature levels. Any variety of forms of thermal processing are contemplated herein.

In the illustrative embodiment the article 50 includes a mold having a shell 52 and a core 54. In other embodiments, however, the article 50 may have a mold different than that of the illustrative embodiment. In some embodiments the article 50 can include a shell having relatively thin walls. In still other embodiments, the article 50 can include one or more passageways formed within the article to allow for passage of a molten metal. The passageways can be formed between portions of the shell, mold, or both, or any other suitable structure. The passageway(s), furthermore, can include one or more bends or turns according to the needs of a given application. In still other embodiments, the mold can include numerous details that together form part of an engineered article. To set forth just one non-limiting example, the mold can be used in some applications to produce a gas turbine engine blade having internal cooling passages.

Figure 2:
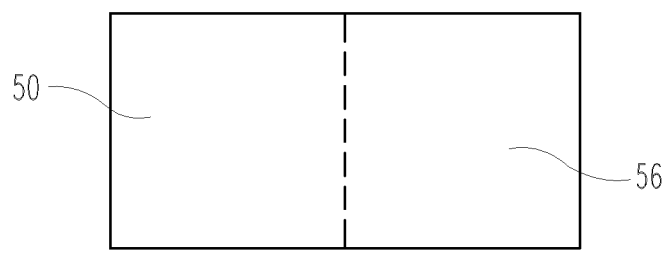
FIG. 2 depicts one embodiment of an article coupled with a support composition.

Turning now to FIG. 2, the article 50 can be coupled with a support composition 56 which can be used to support the article 50, or portions of the article 50, during at least some portions of the temperature processing discussed above. To set forth a non-limiting example of the article 50 that includes the binder matrix, the support composition 56 can be used to stabilize the geometry of the article 50 as the temperature processing softens the article 50 and the binder matrix at least partially leaves the article 50. In some forms the support composition 56 can be used within the article 50, such as between the shell 52 and the core 54, among other possible locations. A free-form fabricated mold type article 50 can include a core 54 and a shell 52, the support composition 56 disposed between a portion of the core 54 and a portion of the shell 52. To set forth just a few non-limiting examples, the support composition 56 can be used to maintain the relative spacing of walls of a passageway, or maintain the relative shape of the article 50 or at least portions of the article 50. In some applications the support composition 56 can be used to prevent the collapse of a passageway or the distortions that may be caused by gravity or other forces acting upon the article 50 during at least some portion of a thermal processing.

The support composition 56 can be conveyed to locations within the article 50 by actions that include, but are not limited to, pouring and injecting. For example, the support composition 56 can have a relatively liquid like properties which allows it to be poured on or into the article 50. In other forms the support composition 56 can be injected into or on the support composition 56. In one form the support composition 56 can originate from a relatively pressurized container from which it can be selectively dispensed and coupled with the article 50. Other actions that provide for the support composition 56 to be conveyed to the article 50 are also contemplated herein. Non-limiting examples of the support composition 56 are provided below.

The support composition 56 can be made of a foam material that can have an open cell construction. Some forms of the foam material can also have a closed cell construction. Examples of foam materials include, but are not limited to, insulating construction foam or isocyanate foam. The support construction 56 is not, however, limited to foam materials. In other embodiments the support construction 56 can take the form of two phase materials, plastic powder, carbon powder, and others. Furthermore, non-porous materials could also be used. The support composition 56 can be a non-porous filler. The support composition 56 can be air curable (not thermal) foam or other (air curable) sacrificial material. The support composition 56, therefore, can be cured using any variety of techniques. In short, many different types of materials and/or compositions and/or structures in addition to those disclosed herein can be used to provide support of the article 50 during at least a portion of the thermal processing.

During the thermal processing of the article 50 as it becomes a hardened article the support composition 56 is sacrificed according to its material and/or composition and/or structure. For example, the support composition 56 can thermally decompose during the temperature processing. In one form the support composition 56 supports the article 50 during burn-out and thereafter eventually decomposes under further temperature processing, where the further temperature processing includes the remaining processing prior to the article becoming hardened or after the article has become hardened. The same is true whether the support composition 56 is sacrificed through any other sacrificial action.

In some forms the support composition 56 can have sufficient permeability to allow evolving gases to readily pass while providing sufficient strength to hold a desired geometry of the article 50 intact. Furthermore, the support composition 56 can evolve, during the temperature processing, into a fairly rigid relatively cellular carbonaceous structure. In some forms the support composition 56 can be rigid prior to the beginning of thermal processing. Some forms of the support composition 56 can eventually oxidize into a gas, but some forms can also evaporate or melt, among other types of changes. The support composition 56 can be removed from the article 50 through any number of actions during or after the thermal processing. To set forth just a few non-limiting examples, the support composition 56, or its byproducts as a result of the sacrificial action, can be poured, dumped, suctioned, or blown from the article 50. Other techniques of removing the sacrificial composition 56 are contemplated herein.

Figure 3:
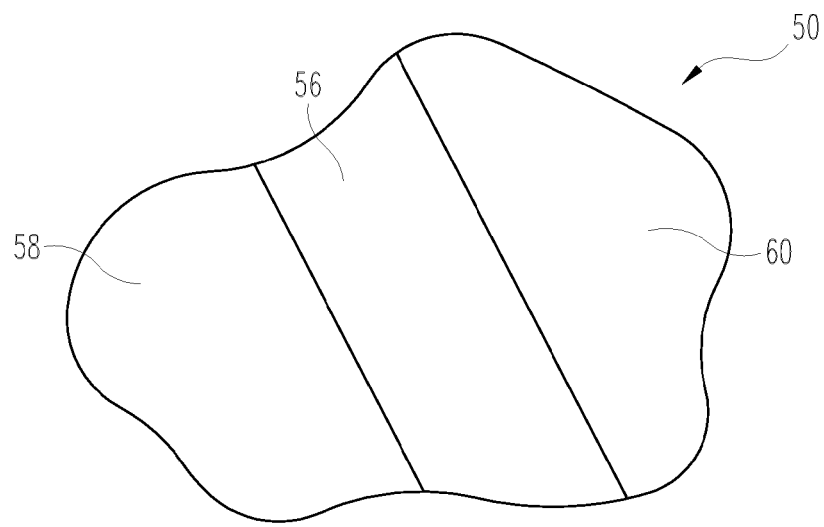
FIG. 3 depicts one view of an article coupled with a support composition.

Turning now to FIG. 3, one embodiment of article 50 and support composition 56 is shown. Portions 58 and 60 of the article 50 are shown on either side of the support composition 56. Such a configuration may be present as between a shell and a core of the article 50, however the portions 58 and 60 can represent any variety of structural features of the article 50, whether or not the portions 58 and 60 represent different features or similar features. The support composition 56, though shown having a relatively constant cross section along the length of the portion depicted, can have any variety of shapes and sizes in other applications. For example, the support composition 56 can have a cross sectional area that varies along the length between the portions 58 and 60. Furthermore, the support composition can be placed between portions 58 and 60 that change direction in addition to relative sizing.

In one form the present application provides an apparatus comprising a ceramic mold article capable of being thermally processed from a pre-fired shape to a fired-shape to produce a fired ceramic mold, and a sacrificial structural material coupled with the ceramic mold article to stabilize the orientation of the ceramic mold article, the sacrificial material dispersible when the ceramic mold article is thermally processed. The sacrificial material can be a non-porous filler.

In another form the present application provides an apparatus comprising a free-form fabricated mold having a binder matrix capable of being burned out to form a fired ceramic mold, and a supporting material coupled with and at least partially removable from the free-form fabricated mold prior to producing a completed fired ceramic mold, the supporting material structured to encourage the free-form fabricated mold to maintain its shape at least during some portion between the starting temperature and processed temperature. The free-form fabricated mold can include a core and a shell, the supporting material disposed between a portion of the core and a portion of the shell.

In still another form the present application provides an apparatus comprising a shaped mold article having a ceramic particle and binder matrix composition, the shaped mold article operable to be processed from a first state to the second state, the second state characterized by a loss of at least a portion of the binder matrix, and means for sacrificially supporting the shaped mold article during processing from the first state to the second state.

In yet another form the present application provides a method comprising forming a ceramic article having ceramic particles, filling a space in the ceramic article with a sacrificial support material, subjecting the ceramic article to a temperature process for hardening the ceramic article, and removing the sacrificial support material during the temperature process.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
    a free-form fabricated ceramic mold article capable of being thermally processed from a pre-fired shaped to a fired-shape to produce a fired ceramic mold; and
    a sacrificial structural material that is a separate component comprised of different material from that of the free-form fabricated ceramic mold article, the sacrificial structural material coupled with the free-form fabricated ceramic mold article to stabilize an orientation of the free-form fabricated ceramic mold article,
    wherein the sacrificial structural material is configured to evolve into a rigid structure during a part of the time when the free-form fabricated ceramic mold article is thermally processed from the pre-fired shape to the fired shape to produce the fired ceramic article;
    the sacrificial structural material configured to be dispersible during a part of the time when the free-form fabricated ceramic mold article is thermally processed from the pre-fired shaped to the fired shape to produce the fired ceramic article.

2. The apparatus of claim 1, wherein the free-form fabricated ceramic mold article is a green ceramic mold prior to being thermally processed from the pre-fired shape to the fired-shape, the green ceramic mold having a binder capable of being burned out when the free-form fabricated ceramic mold article is thermally processed.

3. The apparatus of claim 1, wherein the sacrificial structural material is a foam.

4. The apparatus of claim 3, wherein the foam can be at least one of insulating construction foam and isocyanate packing foam.

5. The apparatus of claim 1, wherein the sacrificial material can be one of at least two phase materials, plastic powder, and carbon powder.

6. The apparatus of claim 1, wherein the sacrificial material is a non-porous filler.

7. The apparatus of claim 1, wherein the ceramic mold article is an investment casting mold for making a gas turbine engine airfoil member upon being thermally processed to form the fired ceramic mold.

8. An apparatus comprising:
    a free-form fabricated mold having a binder matrix capable of being burned out to form a fired ceramic mold; and
    a supporting material that is a separate component comprised of different material from that of the free-form fabricated mold, the supporting material coupled with the free-form fabricated mold prior to producing a completed fired ceramic mold, the supporting material structured to encourage the free-form fabricated mold to maintain its shape during a part of the time or all of the time between a starting temperature and a processed temperature to produce the completed fired ceramic mold,
    the supporting material being configured to become a rigid structure during a part of the time between the starting temperature and processed temperature,
    the supporting material being configured to remove in part or in all from the free form fabricated mold prior to producing the completed fired ceramic mold.

9. The apparatus of claim 8, wherein the thermal processing event is generated by a furnace capable of elevating the temperature of the free-form fabricated mold from a starting temperature to a processed temperature to at least burn out the binder matrix.

10. The apparatus of claim 8, wherein the mold includes a core and is structured to form a gas turbine airfoil shape when used in an investment casting process.

11. The apparatus of claim 8, wherein the free-form fabricated mold includes a core and a shell, the supporting material disposed between a portion of the core and a portion of the shell.

12. The apparatus of claim 10, wherein at least a portion of the supporting material is oxidized to gas between the starting temperature and processed temperature.

13. The apparatus of claim 10, wherein the supporting material changes phase between the starting temperature and processed temperature.

14. The apparatus of claim 10, wherein the supporting material becomes a rigid structure during some portion between the starting temperature and processed temperature.

15. An apparatus comprising:
    a shaped mold article having a ceramic particle and binder matrix composition, the shaped mold article operable to be thermally processed from a first green state to a second state characterized by a loss of at least a portion of the binder matrix, to a third state at which the shaped mold article becomes hardened; and
    a sacrificial support that is a separate component comprised of different material from that of the shaped mold article, the sacrificial support configured to become a rigid structure and hold the shaped mold article during thermal processing from the first green state to the second state, and wherein the sacrificial support is configured to be removed from the shaped mold article during remaining thermal processing that is after the second state and either prior to the third state or after the third state.

* * * * *